United States Patent [19]

Sakato et al.

[11] Patent Number: 4,961,543
[45] Date of Patent: Oct. 9, 1990

[54] ROTATION ADJUSTING APPARATUS IN A CRUSHER

[75] Inventors: Seiichi Sakato; Masahiko Sakato; Kunihiko Matsui; Nobuo Watanabe, all of Chiba, Japan

[73] Assignee: Kabushiki Kaisha Sakato Kosakusho, Japan

[21] Appl. No.: 379,780

[22] Filed: Jul. 14, 1989

[30] Foreign Application Priority Data

Jul. 26, 1988 [JP] Japan ................... 63-184664

[51] Int. Cl.⁵ ............................... B02C 1/06
[52] U.S. Cl. ........................... 241/266; 241/101.7
[58] Field of Search .............. 125/23 R, 23 C; 225/103, 104, 105; 299/67, 22, 85; 294/68, 23, 104, 106, 902; 414/739, 740, 735; 241/101.2, 101.7, 263-269, 286, 287, 259.1, 259.2, 259.3

[56] References Cited

U.S. PATENT DOCUMENTS 4,512,524 4/1985 Shigemizu ................ 241/101.7

FOREIGN PATENT DOCUMENTS 62373 4/1985 Japan .

Primary Examiner—Mark Rosenbaum
Attorney, Agent, or Firm—Lowe, Price, LeBlanc, Becker & Shur

[57] ABSTRACT

A rotation adjusting apparatus in a crusher is disclosed which even if siding members of a rotational mechanism of the crusher wear in use, the wear is adjusted easily and rapidly. In the crusher, a rotational housing with a pair of pawls which crushes or cuts an object, such as a reinforced concrete or a steel frame, to be crushed or cut is held to a fixing member by a holding member such that a wear is adjustable, and the housing can be rotated to a desired rotational angle and fixed there by rotation restricters and a rotation stopper.

12 Claims, 10 Drawing Sheets

F I G.12
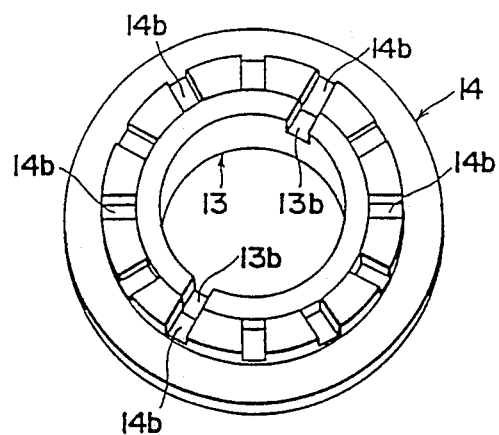
F I G.13
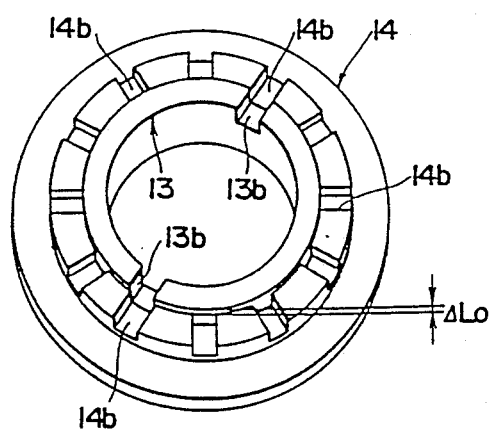

ROTATION ADJUSTING APPARATUS IN A CRUSHER

FIELD OF THE INVENTION

The present invention relates to rotation adjusting apparatus in crushers which are capable of easily and rapidly correcting wear in sliding members, if any, of a rotational mechanism to which a large force is applied to thereby ensure a reliable crushing operation.

BACKGROUND ART

Generally, when a reinforced concrete beam or pillar is crushed or when an oblique reinforced concrete member is crushed with a crusher, it is preferred to apply a shearing force to the concrete member or the like perpendicular to its axis. A known rotatable crusher of this type is disclosed, for example, in Japanese Patent Application laid-open No. 60-62373. Therein, even if the hydraulic excavator is maintained unmoved, an object to be crushed can be broken by a crusher because the angle of the crusher to the object is changeable so that the crusher can be positioned perpendicular to the longitudinal axis of the object, if necessary.

To crush an object such as a reinforced concrete beam or pillar, an excessive load of many tons is applied as a bending moment to the rotational mechanism of the crusher even if the crusher is positioned rotatable to an appropriate position. Therefore, tends to occur early in that rotational mechanism. Thus, the crushing capability is lowered, making it very difficult to crush the object, which is a serious drawback with the prior art.

In order to eliminate such play, it is necessary to repair the whole crusher or to replace the defective crusher with a new one, which would interrupt work as well as be dangerous.

If the crusher is reversed to an appropriate position in a narrow space, a structure or an object, such as an adjacent wall, which should not be crushed could be destroyed, which is also a serious problem.

SUMMARY OF THE INVENTION

The present invention provides, in one aspect, a rotation adjusting apparatus in a crusher, comprising:

a rotational housing;

a pair of pawls for crushing or cutting a reinforced concrete or a steel frame, at least one of the pawls being swung by a driver;

a holding member provided on an outer periphery of a sleeve member which is fixed to a rotating disc integral with the housing;

a fixing member held through spacers between the holding member and the rotating disc;

the rotating disc being superposed on the fixing member so that the housing is capable of being rotatable relative to the fixing member; and a rotation restricting means capable of increasing resistance to the rotation of the housing at a desired rotational angle.

In another aspect, the present invention provides a rotation adjusting apparatus in a crusher, comprising:

a rotational housing;

a pair of pawls for crushing or cutting a reinforced concrete or a steel frame, at least one of the pawls being swung by a driver;

a holding member provided on an outer periphery of a sleeve member which is fixed to a rotating disc integral with the housing;

a fixing member held through spacers between the holding member and the rotating disc;

the rotating disc being superposed on the fixing member so that the housing is capable of being rotatable relative to the fixing member, wherein;

inner engaging portions are formed on an a forward end of the sleeve member;

a plurality of outer engaging portions are provided on one side of the holding member;

a locking cap includes one surface which has a plurality of radial engaging portions engageable to lie over the inner and outer engaging portions; and a rotation restricting means capable of increasing resistance to the rotation of the housing at desired rotational angles.

In a further aspect, the present invention provides a rotation adjusting apparatus in a crusher, comprising:

a rotational housing;

a pair of pawls for crushing or cutting a reinforced concrete or a steel frame, at least one of the pawls being swung by a driver;

a holding member provided on an outer periphery of a sleeve member which is fixed to a rotating disc integral with the housing;

a fixing member held through spacers between the holding member and the rotating disc;

the rotating disc being superposed on the fixing member so that the housing is capable of being rotatable relative to the fixing member;

a rotation restricting means capable of increasing resistance to the rotation of the housing at a desired rotational angle; and a rotation stopping means of the housing at a desired rotational angular position.

Thus, even if the sliding members of the rotational mechanism to which a large force is applied are worn, the wear can be quickly corrected with ease to thereby ensure a crushing operation in the best condition at all times.

BRIEF DESCRIPTION OF THE DRAWINGS

FIG. 12 is a perspective view of a holding nut screwed onto a sleeve;

FIG. 13 is a perspective view of the nut further tightened onto the sleeve;

DETAILED DESCRIPTION OF THE PREFERRED EMBODIMENT

One embodiment of the present invention will now be described with reference to FIGS. 1–16.

Figure 1:
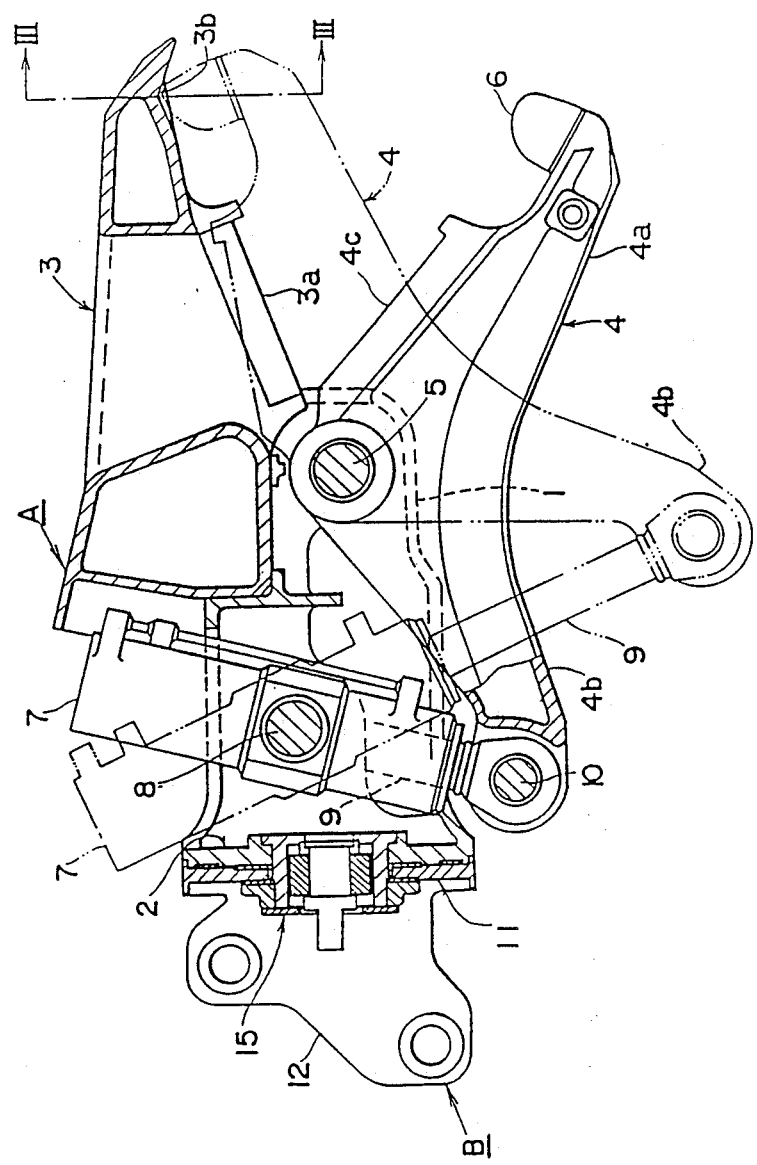
FIG. 1 is a cross section view of one embodiment of the present invention.
Figure 2:
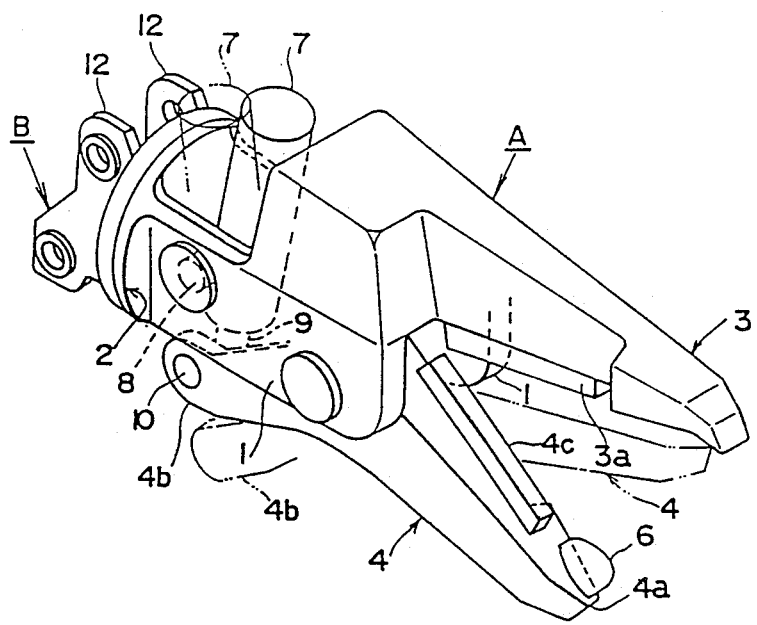
FIG. 2 is a perspective view of the embodiment.

FIGS. 1 and 2 show the structure of the rotational mechanism in which reference character A denotes a housing, which is rotatable, so that its shape or configuration should be specified at its reference position, which is shown in FIG. 1 in this embodiment. The positional relationship between members provided in the housing A should be described using the state of FIG. 1 as the reference. This applies also to the following description.

The housing A has a substantially L-like outer shape as viewed laterally and a gate-like internal cross section. The housing A has a hollow portion and accommodates a swingable arm 4b which constitutes the backward portion of a movable body 4 as one of a pair of pawls, and has side plates 1 of sufficient strength. A rotating disc 2 is provided integrally with and perpendicular to the rear ends of the side plates 1. Thus the housing A is open vertically in the vicinity of the rotating disc 2.

A fixed pawl 3 cooperates with the movable body 4 to form the pair of pawls mentioned above, and has a sharpened end and a base portion thereof fixed integrally with the front end (right-hand end in FIG. 1) of the housing A.

The movable body 4 is rotatably pivoted at its middle portion by a shaft 5 between the side plates 1, and has a plane substantially parallel to the direction in which the fixed pawl 3 extends. The movable body 4 has the swing arm 4b accommodatable between the side plates 1, as mentioned above, and a front pawl portion 4a with an optional abacus bead-like crushing element 6 thereon. In this embodiment, the movable body 4 is substantially triangular and supported by shaft 5 (as viewed laterally).

While in this embodiment the movable body 4 has the pawl and arms 4a and 4b molded integrally to increase their strength, these respective portions may be separate and formed integrally as by welding.

The fixed pawl 3 and the movable body 4 have a blade 3a and a blade 4c, respectively, fixed thereto at opposing positions for performing a cutting operation when the movable body pawl 4a is closed. While the blades 3a and 4c are shown as separate members, for example, in FIG. 2, they may be molded integrally with the corresponding fixed and movable pawls.

Figure 3:
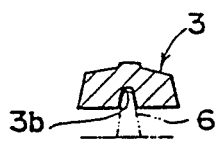
FIG. 3 is a cross section view taken along the line III—III of FIG. 1.

The fixed pawl 3 has at its end a groove 3b which slightly receives an end of the crushing element 6 when the movable body blade 4c is closed (see FIG. 3). By closing the movable body 4 such that the crushing element 6 enters into the groove 3b, an object C to be crushed, such as concrete (see FIGS. 14–16) can be grasped or cut.

One of the pawls is swung by a hydraulic device including a hydraulic cylinder as a driver in order to crush or cut an object, such as a reinforced concrete or a steel frame.

Hydraulic cylinder 7 is provided in the vicinity of the rotating disc 2 between the side plates 1 of the housing A, and more particularly, it is supported in its middle portion by a shaft 8 between the side plates 1. The hydraulic cylinder 7 has a cylinder rod 9 extendible vertically by hydraulic force, and an end of the cylinder rod 9 (the lower rod end in FIG. 1) is connected by a shaft 10 to the rear end (left-hand in FIG. 1) of the swing arm 4b of the movable body 4. Thus, when the rod 9 extends downwardly in FIG. 1, the movable body 4 swings vertically around the shaft 5 via the arm 4b to the position shown by the two-dot chain line from the position shown by the solid line in FIG. 1.

The rotational mechanism and rotation limiter means will now be described with reference to FIGS. 4–13.

Reference character B denotes a fixture which includes an annular fixing plate 11 as a fixing member and a pair of opposing brackets 12 provided at their bases integrally with the fixing plate 11. The fixing plate 11 has an inner collar portion 11a with a through hole at its center.

The rotating disc 2 provided behind the housing A has a circular hole provided at substantially the center of the disc 2 in which a sleeve 13 as a sleeve member is inserted into and fixed perpendicular to the disc 2. The sleeve 13 has male threads 13a on its end and a plurality of inner engaging portions 13b, in the form of a recess, provided along the periphery thereof. In this embodiment, two such recesses 13b are provided at positions opposing each other.

The sleeve 13 is loosely inserted into the hole in the annular fixing plate 11. A nut 14 as a holding member and the sleeve 13 are engaged at their female and male threads 14a and 13a such that one sides of the nut 14 and the rotating disc 2 cooperate to hold the inner collar 11a therebetween with an appropriate holding force. Thus the rotating disc 2 provided integrally with the housing A is rotatable properly relative to the fixing plate 11 with the inner collar 11a.

The nut 14 is formed so as to push the inner collar 11a at one side and has twelve outer engaging portions 14b which are radially provided, in the form of a recess, provided at angular intervals of 30 degrees along the other end of the nut 14 in which there are six pairs of recesses, each pair including two recesses disposed substantially at 180 degrees. The outer engaging portions 14b and the inner engaging portions 13b in the sleeve 13 can align.

Reference numeral 15 denotes a disc-like locking cap which has on one side a pair of radial engaging means 15a, in the form of a protrusion, disposed at an angle of about 180 degrees. The protrusions 15a can, in common, engage the engaging portions 13b and 14b of the sleeve 13 and nut 14.

While in this embodiment the inner and outer engaging portions 13b and 14b are formed as a recess and the protrusions 15a formed as protrusions, the engaging portions 13b and 14b may be formed as protrusions and the protrusions 15a may be formed as a recess. If engagement is ensured, the present invention is not limited to this embodiment.

Reference numeral 16a denotes a flanged collarlike inner sliding spacer of a partial L-like cross section and reference 16b denotes an annular inner sliding spacer. The collar of the spacer 16a contacts the inner peripheral surface of the inner collar 11a and the spacer flange is held between adjacent sides of the inner collar 11a and the rotational disc 2. The spacer 16b is held between adjacent sides of the nut 14 and the inner collar 11a of the fixing plate 11.

An outer sliding spacer 17 is held between an annular spacer groove 11b provided in the fixing plate 11 and the adjacent end of the rotating disc 2. The spacer 17 has a plurality of equispaced holes 17a provided along a line concentric with the spacer 17. In this embodiment, twelve holes 17a are formed at angular intervals of 30 degrees. A plurality of equispaced countersinks 2a are provided along a line concentric with the disc 2 in its end face so as to oppose the holes 17a. In this embodiment, twelve countersinks 2a are provided at angular intervals of 30 degrees.

Reference numeral 18 denotes a rotation restricter as rotation restricting means which includes a cylindrical casing 18a opened at one end, a pusher 18d placed in the casing, a compression coil spring 18c and a restricting ball 18b whereby the ball is pushed by the spring through the pusher so as to appear itself partially outside the open end of the casing. Such restricters 18 are disposed in holes in the annular fixing plate 11 provided along the periphery of a circle concentric to the fixing plate 11 in the vicintiy of its periphery such that the restricting balls 18b are engageable in countersinks 2a in the rotating disc 2 through corresponding semi-circular recesses (see FIG. 10) provided in the outer sliding spacer 17. Thus, the rotating disc 2 integral with the housing A is fixed temporarily as it rotates through a pedetermined angle (30 degrees in this embodiment). An adjusting cap 18e is screwed adjustably onto the other end of the casing 18a to adjust the elasticity of the coil spring 18c.

Reference numeral 19 denotes a rotation stopper as a rotation stopping means privided along a circle which is deviating slightly inwardly from a circle concentric to holes 17a in the outer sliding spacer 17 so as to be fixed to the bracket 12 in order to stop the rotation of the rotating disc 2 relative to the annular fixing plate 11. In more detail, the stopper 19 has a pin 19a which is pushed continuously by a compression coil spring 19b toward the rotating disc 2 so as to be inserted into a hole 11c provided in position in the fixing plate 11 and engaged in the hole 2b provided in position in the rotating disc 2 via the semi-circular notch provided in the outer sliding spacer 17 to thereby fix the rotating disc 2 relative to the fixing plate 11 and prevent rotation of the plate 2.

There are four such holes 2b so as to achieve stops at 90° intervals. The stopping angle may be 60 or 30 degrees.

Figure 4:
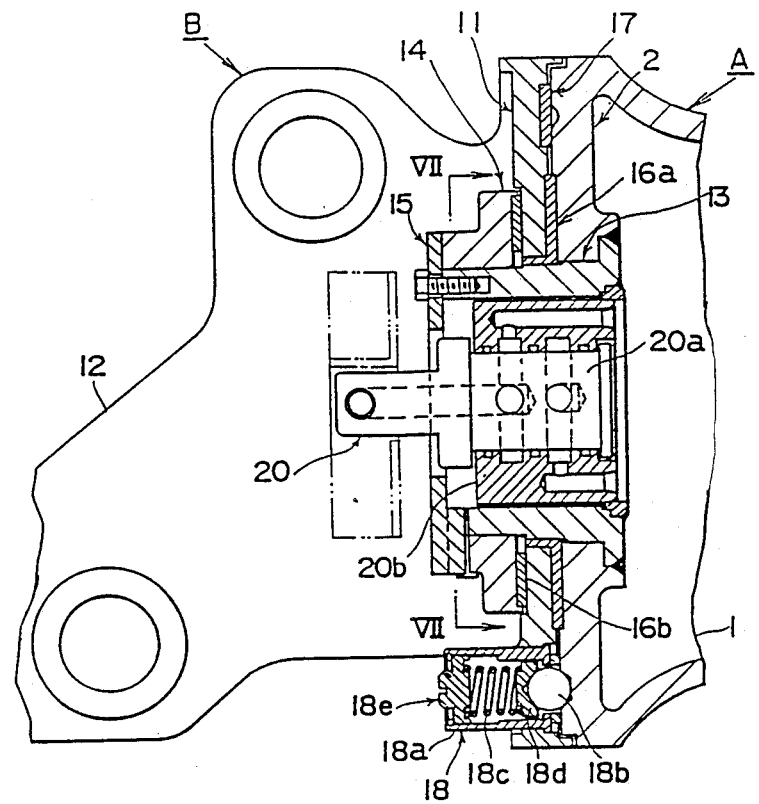
FIG. 4 is a cross section view of the essential portion of the embodiment.
Figure 5:
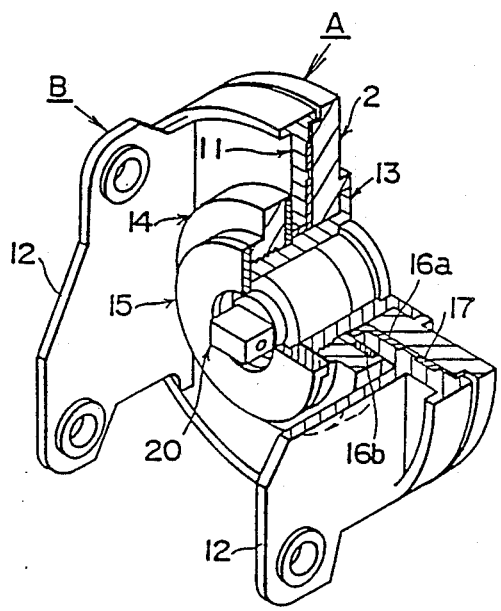
FIG. 5 is a perspective view of a partially cut-away essential portion of the embodiment.
Figure 6:
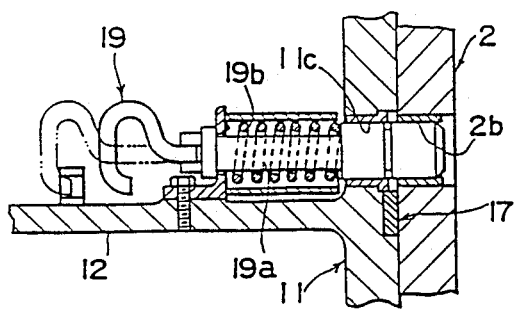
FIG. 6 is a cross section view of a rotation restricter.
Figure 7:
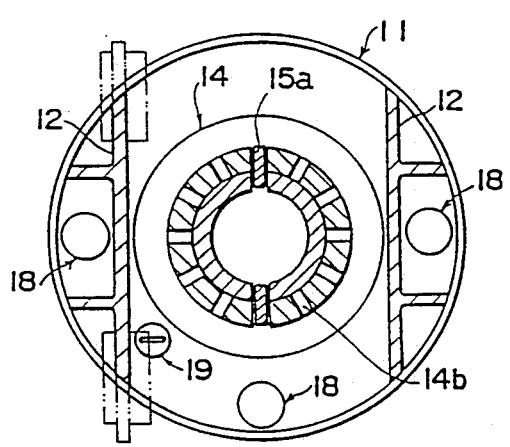
FIG. 7 is a cross section view taken along the line VII—VII of FIG. 4.
Figure 8:
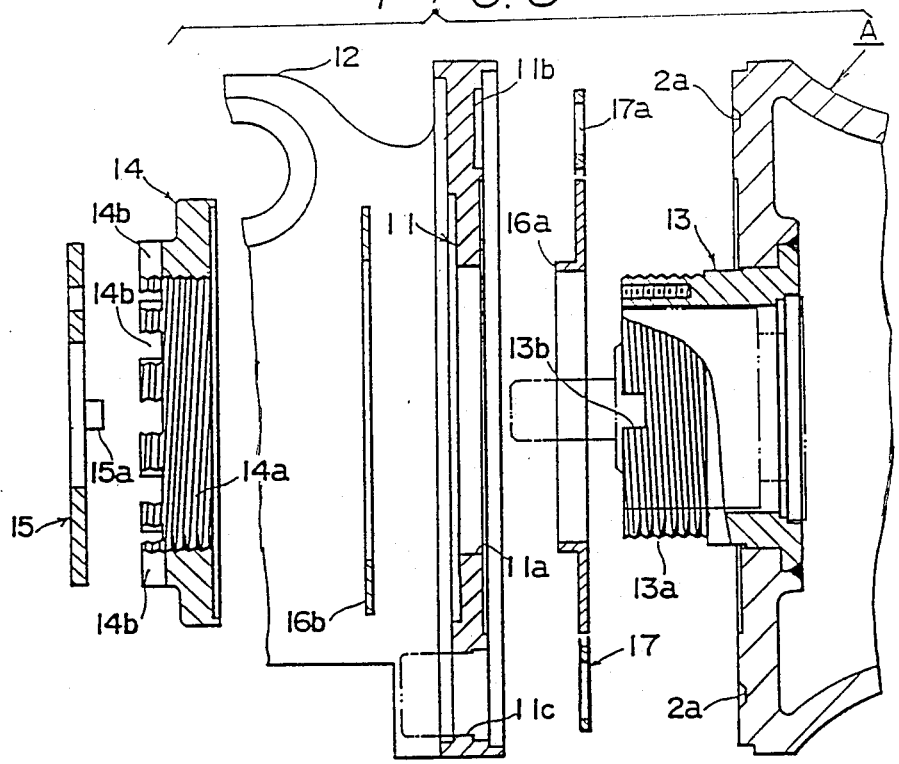
FIG. 8 is a cross section view of an exploded perspective view of the essential portion of the embodiment.
Figure 9:
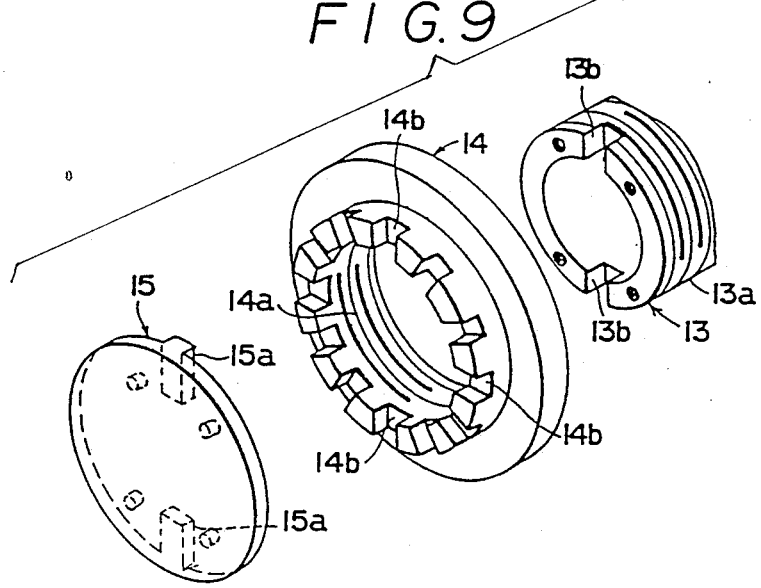
FIG. 9 is an exploded perspective view of the main part of the embodiment.
Figure 10:
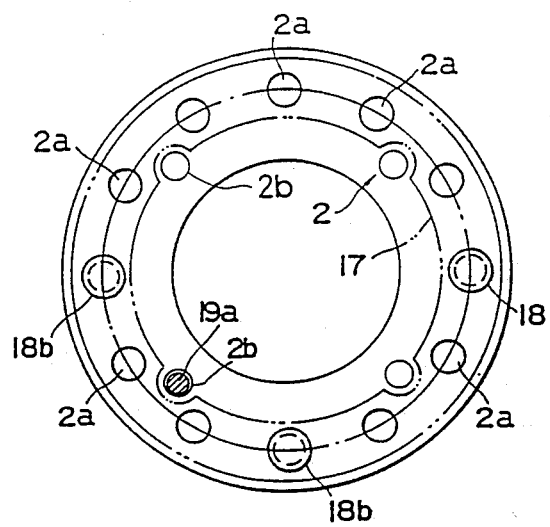
FIG. 10 schematically illustrates the structure of the rotation restricter.

In FIGS. 4 and 5, reference numeral 20 denotes a hydraulic oil passageway joint accommodated in the sleeve 13. More specifically, the hydraulic oil fed from each of two external oil passageways branches out into two ports in a pillar-like branch body 20a and then into separate ports provided in a casing 20a enclosing the branch body 20a. These oil passageways are provided so as to communicate fluidly with two ports provided in the hydraulic cylinder 7. Thus, the oil passageway joint 20 is rotatable appropriately, so that no oil passageways are twisted even if the housing A is turned.

Reference numerals 21 denotes a hydraulic excavator proper; 22, a primary arm; 23, a secondary arm; and 24a and 24b, a swingable link. Reference numerals 25, 26 and 27 denote a first, a second and a third hydraulic cylinder, respectively, and reference character C denotes an object to be crushed.

The operation and effects of the present invention will now be described. According to the inventive crusher, at least one of the pawls of the pair which is capable of crushing or cutting a reinforced concrete or a steel frame is provided rotatable by the hydraulic mechanism in the rotating housing A. The rotating disc 2 integral with the housing A is superposed on the annular fixing plate 11 of the fixing body B. The annular fixing plate 11 is held through the sliding spacers between the rotating disc 2 and the holding nut 14 screwed onto the sleeve 13 fixed to the rotating disc 2. The rotating disc 2 and the housing A to which the rotating disc 2 is fixed are provided rotatable relative to the fixing body B. The rotation restricters are provided such that resistance to rotation is increased each time the rotating disc 2 rotates through a predetermined angle. Thus, even if the sliding members of the rotational mechanism to which a large force is applied may be worn, that wear is corrected so that the crushing operation is performed in the best condition at all times. Second, correction to the wear is performed easily and rapidly.

Figure 14:
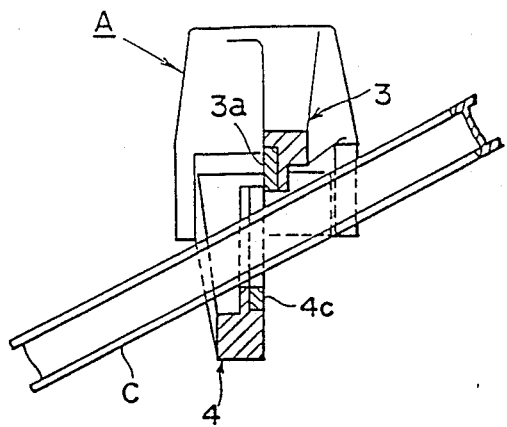
FIGS. 14 and 15 schematically illustrate the crushing operation of the apparatus of the embodiment on an object to be crushed.
Figure 15:
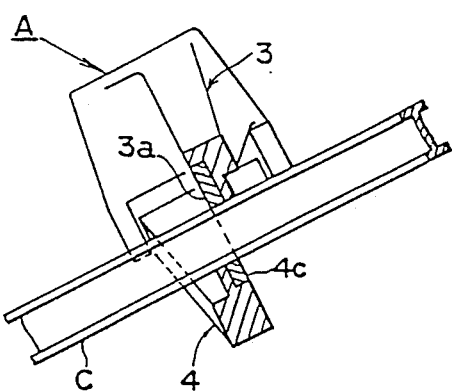
Figure 16:
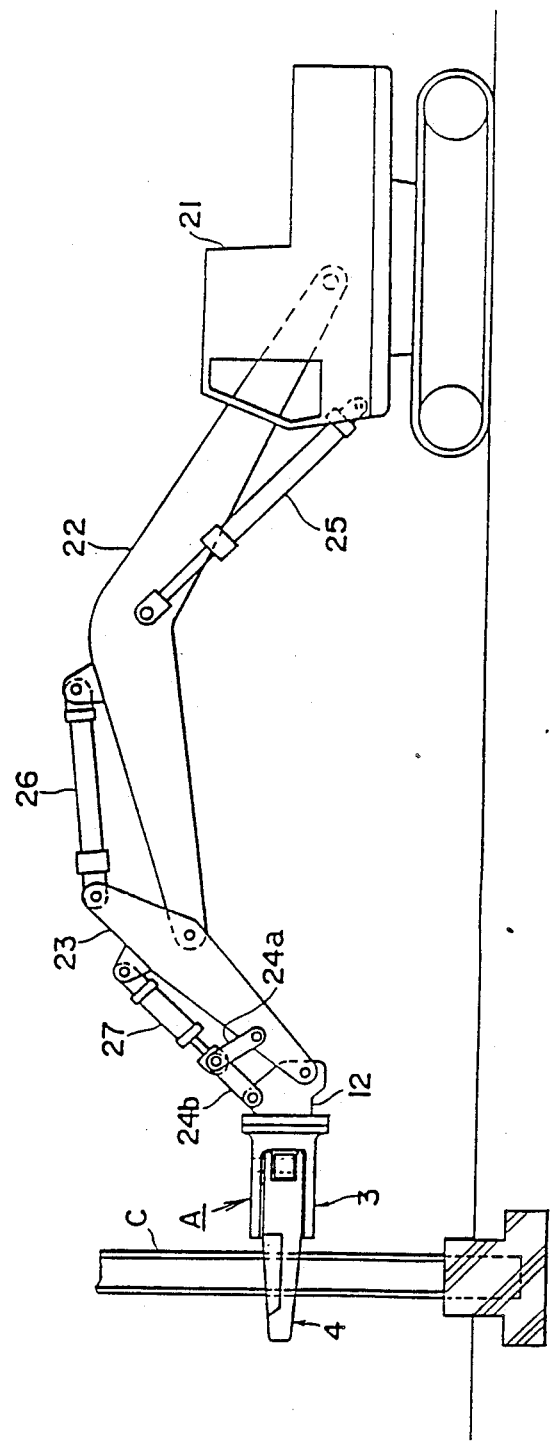
FIG. 16 schematically illustrates the crushing operation of a hydraulic excavator to which the apparatus of the embodiment is fixed.

These effects will be described in more detail. The excavator at an end of the secondary arm 23 provided in the excavator proper 21 is replaced with the crusher according to the present invention, and the cylinder rod 9 is extended or contracted appropriately by the hydraulic drive of the hydraulic cylinder 7 to swing the movable pawl 4a through the swing arm 4b to perform a cutting or crushing operation (see FIG. 16). As shown in FIGS. 14 and 15, according to the present invention, the housing A is provided rotatable relative to the fixing body B, so that the housing A rotates to a proper position to effectively cut an object C such as an oblique structural member. However, an excessive load of many tons is applied as a bending moment or an impact load to the rotational mechanism of the crusher itself because the place where the crusher is used is a nonspecified site where, for example, a building is pulled down. During manipulation of the excavator proper 21, the end of the fixed pawl 3 provided on the housing A often impinges against the object to be crushed C or pulls or pushes the object C. Thus, and excessive load of many tons acts as a bending moment or an impact bending moment on the rotational mechanism positioned between the pawls and the fulcrums of the crusher because the fulcrums of the crusher are at the ends of the secondary arm 23 and swingable link 24b. However, if the crusher is stopped surely and used with the pawl being directed downwardly, a bending moment or an impact load is not virtually applied, as mentioned above, but such a situation cannot occur in a real site. Actually, an excessive load acts, so that the sliding members of the rotational mechanism will be worn and a play will occur very early. Thus, crushing capability is decreased and crushing becomes difficult, which is a serious defect.

According to the present invention, the rotating disc 2 integral with the housing A is superposed on the annular fixing plate 11 of the fixing body B. The fixing plate 11 is held through the sliding spacers between the rotating disc 2 and the holding nut 14 screwed onto the sleeve 13 fixed to the rotating disc 2, and the rotating disc 2 and the housing A with the pawls fixed thereto are provided rotatable relative to the fixing body B. Thus, even if the sliding spacers of the rotational mechanism are worn due to crushing operation, the holding nut 14 can be further tightened to thereby eliminate a play in the fixing plate 11 to recover appropriate holding for the fixing plate 11, to eliminate a play in the housing A, to prevent a decrease in the crushing capability and to provide a crushing operation in the best condition at all times.

Figure 11:
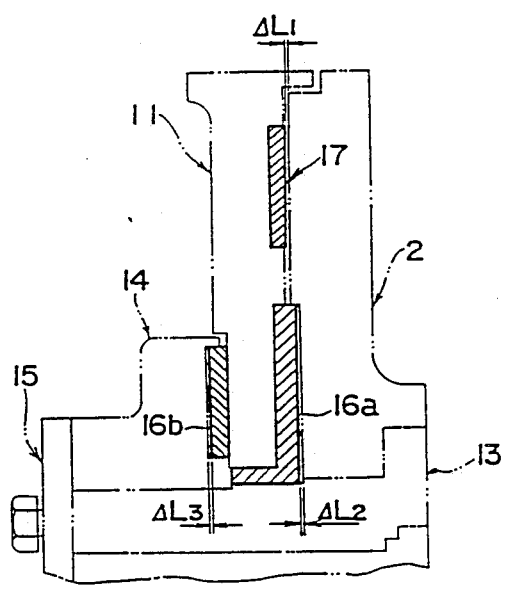
FIG. 11 is a schematic cross section view of worn sliding spacers.

The operation of the crusher according to the present invention will be described more specifically. As shown in FIG. 11, if the degrees of wear in the spacers are different as shown by $\Delta L_1$, $\Delta L_2$ and $\Delta L_3$, although they may often be substantially the same, the nut 14 is tightened by $\Delta L_0$ so as to change from the state of FIG. 12 to that of FIG. 13 in order to eliminate the plays.

Such adjustment of the plays can be completed very easily and rapidly simply by only tightening the holding nut 14 appropriately after the cap 15 is removed. Therefore, it is completely unnecessary to repair the whole crusher or to replace the defective crusher with a new one.

Since the holding nut 14 is necessarily positioned structurally on the opposite side of the fixing plate 11 from the object to be crushed C, tightening is easy.

According to the present invention, the inner engaging portions 13b are formed on the forward end periphery of the sleeve 13, the outer engaging portions 14b are formed on the end surface of the holding nut 14, and the radial engaging protrusions 15a provided on one end surface of the locking cap 15 are engageable in common with the engaging portions 13b and 14b. Therefore, it is ensured that secure engagement between these parts prevents the appropriately tightened holding nut 14 from loosening and rotating to thereby ensure a safe rapid crushing operation.

By provision of the rotation stopper 19 which stops the rotation of the crusher at a desired rotational angular position, the rotational angle of the crusher can be fixed to an appropriate value to thereby control the movement of the crusher according to the present invention. Therefore, according to the present invention, when the crusher is rotated at an appropriate position in a narrow crushing site, a crushing operation can be performed in a crushing orbit which does not crush an object adjacent to the crusher, so that the operator can securely crush only an object to be crushed C in safety, whereas in the prior art, a serious situation is likely to arise in which an object which should not be crushed absolutely, for example, a wall close to the crushing site, will often be crushed during the turning of the crusher.

As mentioned above, according to the present invention, even if the object to be crushed C extends in any direction, the crushing operation can be performed in the best condition such that the crusher is placed so as to be perpendicular to the longitudinal axis of the object. A possible play in the rotational mechanism generated due to various crushing operations is eliminated very easily and rapidly. In addition, only an object to be crushed C can be crushed surely with no other objects being damaged even in a very narrow space.

What is claimed is:

1. A rotation adjusting apparatus in a crusher, comprising:
   a rotational housing;
   a pair of pawls for crushing or cutting a reinforced concrete or a steel frame, at least one of the pawls being swung by a driver;
   a holding member provided on an outer periphery of a sleeve member which is fixed to a rotating disc integral with the housing;
   a fixing member held through spacers between the holding member and the rotating disc;
   the rotating disc being superposed on the fixing member so that the housing is capable of being provided rotatable relative to the fixing member; and
   rotation restricting means, disposed between the rotating disc and fixing member, for increasing resistance to rotation of the housing at a desired rotational angle
   wherein said holding member is slidable on its inner peripheral surface on the outer peripheral surface of said sleeve member and selectively movable along the sleeve member to advance the fixing member toward the rotating disc in the event of spacer wear.

2. A rotation adjusting apparatus according to claim 1, wherein a plurality of said rotation restricting means is provided along the periphery of the fixing member.

3. A rotation adjusting apparatuses according to claim 1, wherein the driver includes a hydraulic device including a hydraulic cylinder.

4. A rotation adjusting apparatus according to claim 3, wherein the sleeve member contains a hydraulic oil passageway joint formed without twists even if the housing containing the hydraulic cylinder rotates.

5. A rotation adjusting apparatus according to claim 1, wherein said holding member is formed into a nut provided with female threads on its inner peripheral surface, said nut being capable of threadedly engaging with a male thread formed on the outer peripheral surface of the sleeve member.

6. A rotation adjusting apparatus in a crusher, comprising:
   a rotational housing;
   a pair of pawls for crushing or cutting a reinforced concrete or a steel frame, at least one of the pawls being swung by a driver;
   a holding member provided on an outer periphery of a sleeve member which is fixed to a rotating disc integral with the housing;
   a fixing member held through spacers between the holding member and the rotating disc;
   the rotating disc being superposed on the fixing member so that the housing is capable of being provided rotatable relative to the fixing member, wherein:
   inner engaging portions are formed on a forward end of the sleeve member;
   a plurality of outer engaging portions are provided on one side of the holding member;
   a locking cap including one surface formed with a plurality of radial engaging portions engageable with the inner and outer engaging portions; and
   rotation restricting means, disposed between the rotating disc and fixing member, for increasing resistance to rotation of the housing at desired rotational angles
   wherein said holding member is slidable on its inner peripheral surface on the outer peripheral surface of said sleeve member and selectively movable along the sleeve member to advance the fixing member toward the rotating disc in the event of spacer wear.

7. A rotation adjusting apparatus according to claim 6, wherein the inner and outer engaging portions are formed into a recessed shape and wherein the engaging portions of the locking cap are formed into a convex shape.

8. A rotation adjusting apparatus according to claim 6, wherein twelve radial outer engaging portions are provided at angles of 30 degrees to one another and wherein the inner engaging portions and the engaging portions of the cap are each two in number and in opposing relationship.

9. A rotation adjusting apparatus according to claim 6, wherein said holding member is formed into a nut provided with female threads on its inner peripheral surface, said nut being capable of threadedly engaging with a male thread formed on the outer peripheral surface of the sleeve member.

10. A rotation adjusting apparatus in a crusher, comprising:

a rotational housing;

a pair of pawls for crushing or cutting a reinforced concrete or a steel frame, at least one of the pawls being swung by a driver;

a holding member provided on an outer periphery of a sleeve member which is fixed to a rotating disc integral with the housing;

a fixing member held through spacers between the holding member and the rotating disc;

the rotating disc being superposed on the fixing member so that the housing is capable of being provided rotatable relative to the fixing member;

wherein said holding member is slidable on its inner peripheral surface on the outer peripheral surface of said sleeve member and selectively movable along the sleeve member to advance the fixing member toward the rotating disc in the event of spacer wear;

rotation restricting means, disposed between the rotating disc and fixing member, for increasing resistance to rotation of the housing at a desired rotational angle; and means for preventing rotation of the housing at a desired rotational angular position.

11. A rotation adjusting apparatus according to claim 10, wherein the rotation preventing means is fixed to the fixing member and includes a pin engageable with the rotating disc via a sliding spacer for fixing the housing relative to the fixing member.

12. A rotation adjusting apparatus according to claim 10, wherein said holding member is formed into a nut provided with female threads on its inner peripheral surface, said nut being capable of threadedly engaging with a male thread formed on the outer peripheral surface of the sleeve member.

* * * * *